Patented Sept. 12, 1922.

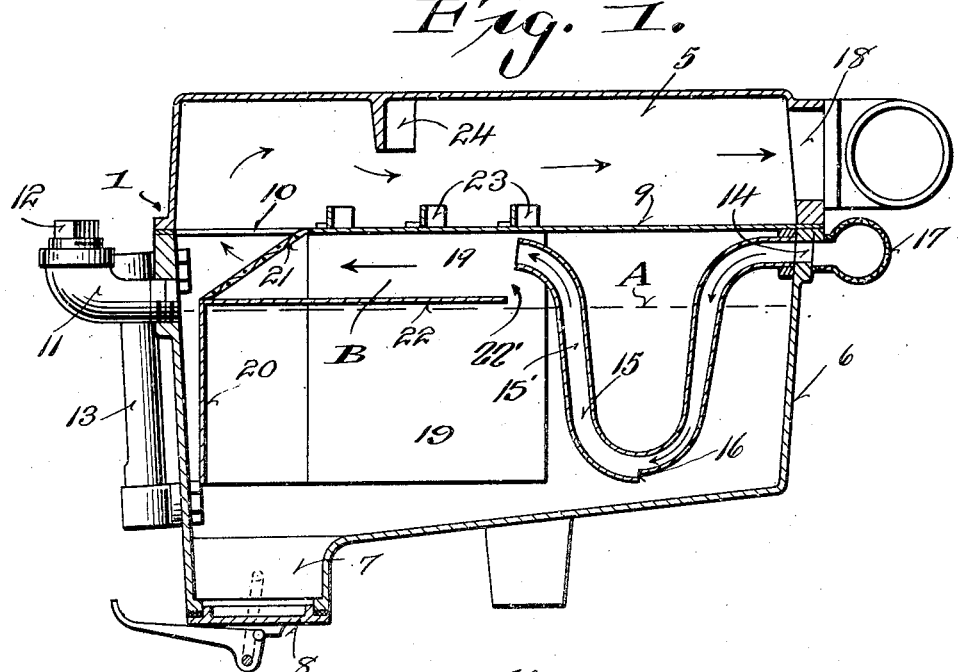

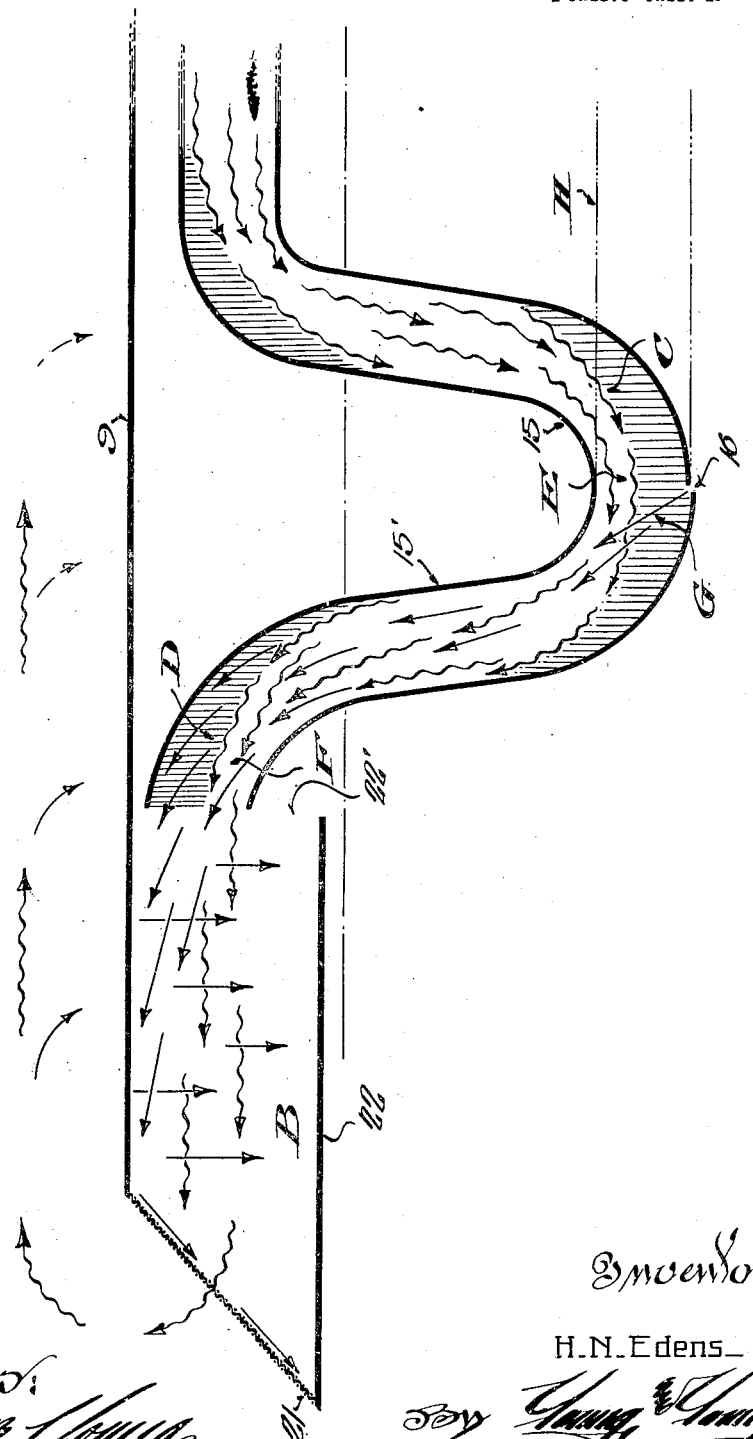

1,428,950

UNITED STATES PATENT OFFICE.

HENRY N. EDENS, OF NEW HOLSTEIN, WISCONSIN.

APPARATUS FOR CLEANING AIR AND OTHER GASES.

Application filed October 20, 1919. Serial No. 331,938.

*To all whom it may concern:*

Be it known that I, HENRY N. EDENS, a citizen of the United States, and resident of New Holstein, in the county of Calumet and State of Wisconsin, have invented certain new and useful Improvements in Apparatus for Cleaning Air and Other Gases; and I do hereby declare that the following is a full, clear, and exact description thereof.

My invention pertains to new and useful improvements in a method and apparatus for filtering and washing gases, and has particular reference to the cleansing of air for use in the fuel mixtures of internal combustion engines.

It being the primary object of the invention to procure a maximum cleaning efficiency with extreme simplicity of structure, various natural laws relating to the actions of gases and liquids under different conditions are taken advantage of, and combined, to arrive at the desired results in the present method. For instance it is a fact that a gas acting under suction will follow the shortest possible course in flowing through a tortuous or non-straight passageway, and for this reason at certain points therein the gas stream is rarefied. The majority of the gas particles of the gas stream at said certain points will occupy the space on one side of the passageway and at the opposite side thereof there will be a considerable vacuum which, of course, is not present where the gas stream completely fills the passageway.

On the other hand liquid, being heavier than gas, its inertia causes it to act very differently from the latter, and the shortest path in a crooked passageway, or one having more or less rightangular bends, is not followed as with gas. Thus liquid being sucked through a rightangular passageway, for example, continues to travel in the direction in which it was initially started in one arm of such a passageway even past the entrance to the other arm of the latter.

These well known and several other less important characteristics of liquids and gases are combined and arranged and associated with certain improved structural features to produce the present invention, which, however, consists fundamentally in introducing a stream of liquid into a rapidly moving current of gas to break up and thoroughly atomize the former so that it will be effectively commingled with the latter to separate particles of solid materials and the like therefrom. In practice the liquid and gas are sucked through a passageway together.

More specifically the invention resides in providing a passageway with at least two substantially rightangular bends, in the bottom of the lowermost one of which is a liquid spray inlet, and over the suction end of the passageway a preferably inclined reticulated screen. Said lowermost bend and the portion of the passageway leading therefrom are submerged in a liquid thus disposing the other bend and the screen end portion of the passageway substantially horizontally and above the surface of the liquid. This screen end being either directly or indirectly connected with a vacuum producer such as an engine cylinder, and the other end open to the atmosphere, suction will be created therein to consequently draw a current of air therethrough, and together with it a stream of liquid from the liquid spray inlet.

The current of liquid entering the passageway transversely of the direction of the flow of air, will be finely and thoroughly atomized and will strike the air stream at its point of rarification to be thus thoroughly commingled therewith. Owing to the inertia of the liquid the same will be quite largely separated from the air subsequently to the initial mixing and formed into a spray through which the air must again pass, the air finally flowing through the said screen over the reticulations of which a film of liquid continuously creeps due to capillarity.

A construction and arrangement, such as this, in addition to thorough washing of the air as a result of an efficient commingling of the gas and liquid, provides a means for maintaining an approximately uniform amount of liquid sprayed irrespective of changes in air velocity, means for obtaining liquid from an unvarying and substantially constant level supply in such a manner as to prevent agitation of the latter, and means for forming a liquid seal in the gas passageway which will initially retard and prevent the flow of gas therethrough when suction is first created, this being an effective way of cutting off air supply when an internal combustion engine to which the apparatus is attached is first started to procure a rich mixture.

One form of apparatus for obtaining the foregoing results and for mounting the referred-to bent passageway is depicted in the accompanying drawing, this arrangement being for use in connection with the engines of tractors and other heavy duty motor vehicles.

In the accompanying drawing:

Figure 1 represents a vertical longitudinal sectional view through an air washer or cleaner constructed in accordance with my invention.

Figure 2 is a plan view of the lower section of the apparatus, the upper or separating section having been removed, and Figure 3 is a diagrammatic view showing more particularly the actions of the cleansing liquid on the gas being washed and the respective paths of flow of both.

In the illustrated embodiment of the invention, it will be seen that the same may be compactly arranged within a closed casing 1 of appropriate size and consists of a lower or reservoir section 6 and an upper or separating section 5, the latter also serving as a removable cover. The bottom of the reservoir section 6 is provided at one end with a discharge or drain opening 7 normally closed by means of a suitable readily detachable cover plate 8, the other portions of said bottom being inclined downwardly toward this drain opening 7. Such a structure permits any sediment to be drained into and trapped at the lowest end of the section 6 and to be removed therefrom when the cover plate 8 is taken off.

This lower or reservoir section 6 is further provided with a filling spout 11 which opens through one end wall thereof, preferably the wall adjacent which the outlet 7 is located. Water or other cleansing liquid, depending upon the use to which the washing apparatus is to be used, is poured into the reservoir section 6 through this filling spout 11 up to the level line A, after which the spout is closed by a plug 12. It is desirable that the level A be maintained, therefore the last mentioned end wall of the reservoir section is provided with a sight glass 13.

The upper or separating section 5 has an outlet opening 18 which is preferably adapted to be connected with the air intake of a carbureter. This outlet 18 is positioned at the end of the casing 1 remote from the filling spout 11 and sight feed 13, and at the same end is a horizontal row of air inlet ports 14, these being formed in the present instance in the end wall of the lower section 6. A screen cage 17 is secured to the outside of the casing 1 and covers the inlet ports 14.

A flattened tube 15 is carried by the lower or reservoir section 6 and communicates with the inner ends of the air inlet ports 14, this tube preferably being substantially U-shaped with the free ends of its arms extended laterally in opposite directions. As shown one of these laterally extended ends communicates with said inlet ports 14, and both are located above the normal liquid level A, although the major portions of the arms as well as the bight of the tube are below said level A. At the lowest point of the tube 15, which is in the center of the under side of the bight thereof, is formed an inlet opening 16, this being preferably made by forming a slit transversely of the tube from one side to the other and then pressing the material of the tube inwardly. This slightly restricts the cross-sectional area of the tube outwardly of the opening 16.

The two sections 5 and 6 of the casing 1 are separated by a partition plate 9, this plate in effect forming the bottom of the separating section 5 and the top of the reservoir section 6. The end of the partition plate 9 adjacent the filling spout 11 is cut out to provide a passageway 10 between the two sections 5 and 6, and disposed inwardly of this cutout portion 10 are two side openings 10'. The partition plate carries a pair of depending deflecting aprons 19 which hang in the lower or reservoir section and extend to a point spaced slightly above the bottom thereof, the inner ends of these aprons engage the side walls of said reservoir section 6, and the other end portions extend toward each other and are connected by a vertical end plate 20.

A horizontal plate 22 has its opposite sides secured to the aprons 19 and one end to the upper edge of the plate 20, which plate is slightly spaced from the filling spout end of the casing 1 to permit liquid to flow therebetween. From Figure 1 it will be seen that this horizontal plate 22 is positioned substantially parallel to the partition plate 9 and extends from a point below the outer side of the opening 10 to a point approximately below the end of the inner arm 15' of the flattened tube 15. An inclined screen 21 of reticulated material extends from the inner side of the opening 10 to the outer end of the plate 22. Thus, although the distance between the partition 9 and the horizontal plate 22 is greater than the width of the tube 15, and the plate 22 is only slightly spaced above the normal water or liquid level A, a virtually continuous passageway B is formed from the screen cage 17 to the inclined screen 21, this passageway only being interrupted by a liquid inlet 16 and a liquid drain outlet 22', the latter being formed by the space between the lower edge of the outer end of the tube arm 15' and the inner edge of the horizontal plate 22.

The upper or separating section 5 is substantially a passageway having its inlet at one end formed by the opening 10 and its outlet at the other as at 18. The intermediate portion of such passageway is provided with a plurality of baffles, the partition plate 9 having a series of transverse baffle ribs 23, and the top of the section 5 having a depending transverse baffle flange 24. The liquid charged air striking against these baffles as will be hereinafter more particularly pointed out, will be retarded in its flow and the liquid separated out to drain back into the reservoir section through the openings 10'.

Assuming that the foregoing described structure is to be used in connection with an internal combustion engine of a tractor or the like, and that the reservoir section 6 has been filled with water through the outspout 11 to the liquid level A, and the outlet opening 18 connected with the air intake of a carbureter, the operation is substantially as follows: When the engine is idle the water, of course, fills both of the arms of the tube 15 to the level A, it flowing thereinto through the spray opening 16, thereby providing a seal in the air passageway and cutting off all flow of air to the carbureter. This condition exists momentarily after suction is created in the engine cylinders by turning the crank shaft so that an effective choke is formed whereby a rich mixture or pure supply of combustible gas is sucked into the engine cylinders for the initial explosion.

After the first couple of explosions, however, normal operation of the apparatus takes place, the water seal having been broken by the increased suction and the tube 15 cleared of all the excess water permitted to flow thereinto when the engine is idle. In other words the requisite quantity of air is sucked into the passageway through the screen cage 17, chaff and other foreign particles being removed from the air by the latter, where it is impregnated with the atomized water sprayed through the opening 16. After the air is thoroughly washed it passes into the separating section 5 and the liquid separated therefrom before it passes into the carbureter.

The actual operation of the primary part of the invention, which consists of that passageway B extending from the screen cage 17, to the inclined screen 21, is best seen from Figure 3. As hereinbefore mentioned, a gas which is sucked through a bent passageway is rarified at the curves of the passageway. Therefore in the present instance at least two substantially right-angular bends are formed in the passageway B, one of these bends C being below the liquid level A and the other D above the liquid level. The air following its shortest course through the passageway B, will be rarified at the bends C and D and the great majority of the air particles will be adjacent the upper side of the former as indicated at E, and disposed toward the lower side of the bend D as shown by the wavy lines at F. A considerable vacuum is formed in the passage immediately below the rarified air stream at E, and at this point a liquid spray opening, such as the slit 16 is formed, and the liquid entering the passageway transversely of the direction of flow of air will strike the air stream at this rarified portion as indicated by the arrows G, the liquid being thereby thoroughly atomized thus effecting an efficient commingling of the liquid and air.

The liquid sucked into the passageway and combined with the air will be drawn up the arm 15', but will not flow directly into the horizontal portion of the passageway B in the path taken by the air which crowds the lower side of the bend D, as indicated at F, in view of the fact that its inertia will cause it to travel on toward the upper side of the bend D and impinge thereagainst, or in other words against the upper portion of the laterally bent end of the arm 15' and against the adjacent part of the partition plate 9. The liquid will thereupon be deflected downwardly toward the plate 22 in the form of spray so that the air stream is again treated with liquid, this time being forced to pass through a spray instead of having the liquid sprayed thereinto as in the first instance. Some of the liquid which strikes against the upper part of the horizontal portion of the passageway B, that is to say the plate 9, will be carried along by capillary action and caused to run over the screen 21. In fact the latter will be completely covered with a thin film of liquid through which the air must pass before entering the separating section 5. Surplus water from the horizontal portion of the passageway B flows therefrom through the outlet 22' and from the opposite end of this horizontal portion through the lower edge of the screen 21. From this it will be noted that as far as efficient operation of the invention is concerned, it is immaterial that the tube portion 15 of the passageway B be in the form of a U-shaped member. As indicated by the dotted lines H in Figure 3, the intake end of the tube 15 beyond the bend C may be substantially straight or horizontal.

It is desired to call attention to the fact that the size of the spray opening 16 is relatively immaterial as the amount of liquid sucked into the passageway is automatically regulated and retained approximately uniform regardless of the air velocity, by the liquid itself, together with the action of the suction thereon. The surface of the liquid within the casing 1, although unaffected by atmospheric conditions, being enclosed therein, is subjected to the vacuum created by the suction within the engine cylinders or the like in view of the break in the passageway B, for instance as at 22'. Pressure on the surface of said liquid, it will be seen from the drawings, will tend to urge the liquid through the port 16, and conversely, removal of pressure from said surface by the formation of a partial vacuum in the casing 1 will prevent such ready entrance of the liquid into the tube 15 through said port 16. Thus the movement of the water through the port 16 will vary considerably in accordance with the degree of vacuum created, and this fact will tend to cause the amount of liquid forcibly sucked into the tube 15 to remain more or less constant irrespective of the velocity of the gas passing through the latter.

It should also be noticed that since the liquid inlet 16 is positioned way below the liquid level A and adjacent the highest end of the bottom of the reservoir section 6, agitation of the body of cleansing water is not caused to any appreciable extent, this being in contradistinction to those washing and cleaning devices wherein the gas to be cleaned is blown or sucked through a body of water. Since there is practically no agitation in the present apparatus the dirt particles will be drained into the outlet 7 and will not be sucked into the passageway B upon re-use of the water.

In view of the nature of this invention, it is obvious that various other forms of apparatus may be employed for reaching the same results, and also that many changes or variations may be made in the depicted apparatus, without departing from the following claims or sacrificing any of the features and advantages thereof.

I claim:

1. An apparatus for cleaning gas comprising a closed casing, one portion forming a liquid reservoir, means for connecting the portion of the casing above the liquid level with vacuum creating means, and a gas passageway in said casing and having a return bend therein below said liquid level, a liquid inlet port opening into said passageway through the outer wall of said return bend, one end of the passageway being in communication with a source of gas supply, the other end being above the liquid level and opening into that portion of the casing thereabove.

2. An apparatus for cleansing gas comprising a liquid reservoir, and a gas passageway having a bent portion intermediate its ends, said bent portion being submerged in the liquid of said reservoir, an inlet port in said bent portion, one end of the passageway being connected with a suitable source of gas supply and the other end with means for creating suction therein, whereby to draw a supply of gas through the passageway and simultaneously suck thereinto a supply of liquid from the reservoir.

3. An apparatus for cleansing air comprising a casing adapted to contain cleansing liquid in its lower portion, a discharge port in the upper portion of the casing, a passageway in the casing communicating with the upper portion thereof and having a bent portion disposed below the normal level line for liquid in the casing, said passageway being provided with a spray inlet in said bent portion adapted to permit suction spray discharge of liquid into the passageway upon flow of air through the passageway.

4. A device for cleansing air comprising a casing adapted to contain cleansing liquid in its lower portion, a discharge port in one upper end portion of the casing, and a passageway extending through the casing and opening exteriorly of the specified end portion of the casing above the normal level of fluid in the casing, a portion of said passageway being bent downwardly to extend below said normal level of liquid, the bent portion having a spray inlet therein to permit suction spray discharge of liquid into the passageway upon flow of air through the passageway.

5. A device for cleansing air comprising a casing adapted to contain cleansing liquid in its lower portion, a discharge port in one upper end portion of the casing, a passageway in the casing opening exteriorly of the specified end portion of the casing above the normal level of fluid in the casing, a portion of said passageway being bent downwardly to extend below said normal level of liquid and provided with a spray jet aperture at the lowest portion thereof, and a series of baffle members in the upper portion of the casing.

6. An apparatus for cleansing air comprising a casing adapted to contain cleansing liquid in its lower portion, a horizontally flattened passageway in the casing having a width slightly less than the width of the casing, said passageway being open at one end exteriorly of the casing, an outlet port in said end of the casing above the passageway, a portion of the passageway being bent to extend below the level line of liquid and provided with a spray inlet, and a partition plate in the upper portion of the casing extending between the passageway and said outlet port.

In testimony that I claim the foregoing I have hereunto set my hand at New Holstein, in the county of Calumet and State of Wisconsin.

HENRY N. EDENS.